US009267467B2

United States Patent
Peters et al.

(10) Patent No.: US 9,267,467 B2
(45) Date of Patent: Feb. 23, 2016

(54) SYSTEMS AND METHODS FOR A TWO-VALVE NON-INTEGRATED REFUELING CANISTER ONLY SYSTEM

(71) Applicant: Ford Global Technologies, LLC, Dearborn, MI (US)

(72) Inventors: Mark W. Peters, Wolverine Lake, MI (US); Mark Daniel Bunge, Dearborn, MI (US); Dennis Seung-Man Yang, Canton, MI (US); Russell Randall Pearce, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 267 days.

(21) Appl. No.: 14/024,416

(22) Filed: Sep. 11, 2013

(65) Prior Publication Data
US 2015/0068498 A1    Mar. 12, 2015

(51) Int. Cl.
*F02M 33/02* (2006.01)
*F02M 25/08* (2006.01)

(52) U.S. Cl.
CPC .................................. *F02M 25/0854* (2013.01)

(58) Field of Classification Search
CPC ........... F02M 25/0836; F02M 25/0854; B60K 15/03504
USPC .......... 123/516, 518, 520, 457, 506, 510, 511
See application file for complete search history.

(56) References Cited

U.S. PATENT DOCUMENTS

| 4,699,638 | A | 10/1987 | Harris |
| 5,584,278 | A | 12/1996 | Satoh et al. |
| 6,533,002 | B1 * | 3/2003 | Kobayashi et al. ........... 141/302 |
| 7,823,610 | B2 * | 11/2010 | King .............................. 141/303 |
| 8,082,905 | B2 | 12/2011 | Mai et al. |
| 2009/0191470 | A1 | 7/2009 | Shirasaki |
| 2012/0152370 | A1 | 6/2012 | Menke et al. |
| 2013/0112176 | A1 | 5/2013 | Peters et al. |

FOREIGN PATENT DOCUMENTS

WO    9624792 A1    8/1996

OTHER PUBLICATIONS

Pifher, Kevin L. et al., "Method and System for Fuel System Control," U.S. Appl. No. 13/559,455, filed Jul. 26, 2012, 31 pages.
Dudar, Aed M. et al., "Fuel Tank Depressurization Before Refueling a Plug-In Hybrid Vehicle," U.S. Appl. No. 13/906,187, filed May 30, 2013, 28 pages.
Pearce, Russell Randall et al., "Engine-Off Leak Detection Based on Pressure," U.S. Appl. No. 13/962,562, filed Aug. 8, 2013, 27 pages.
Bolger, Bryan Michael et al., "Systems and Methods for Refueling Canister System," U.S. Appl. No. 14/260,900, filed Apr. 24, 2014, 52 pages.

* cited by examiner

*Primary Examiner* — Hai Huynh
(74) *Attorney, Agent, or Firm* — James Dottavio; Alleman Hall McCoy Russell & Tuttle LLP

(57) ABSTRACT

A system for a vehicle, comprising: a tank pressure control valve coupled in a first conduit between a fuel tank and a fuel vapor canister; a refueling valve coupled in a second, different, conduit between the fuel tank and the fuel vapor canister, the second conduit in parallel to the first conduit. In this way, two smaller, less complex valves may be utilized to control fuel tank vapor purging and fuel tank depressurization during refueling. This in turn may lower system cost and increase system functionality.

19 Claims, 5 Drawing Sheets

Figure 1:
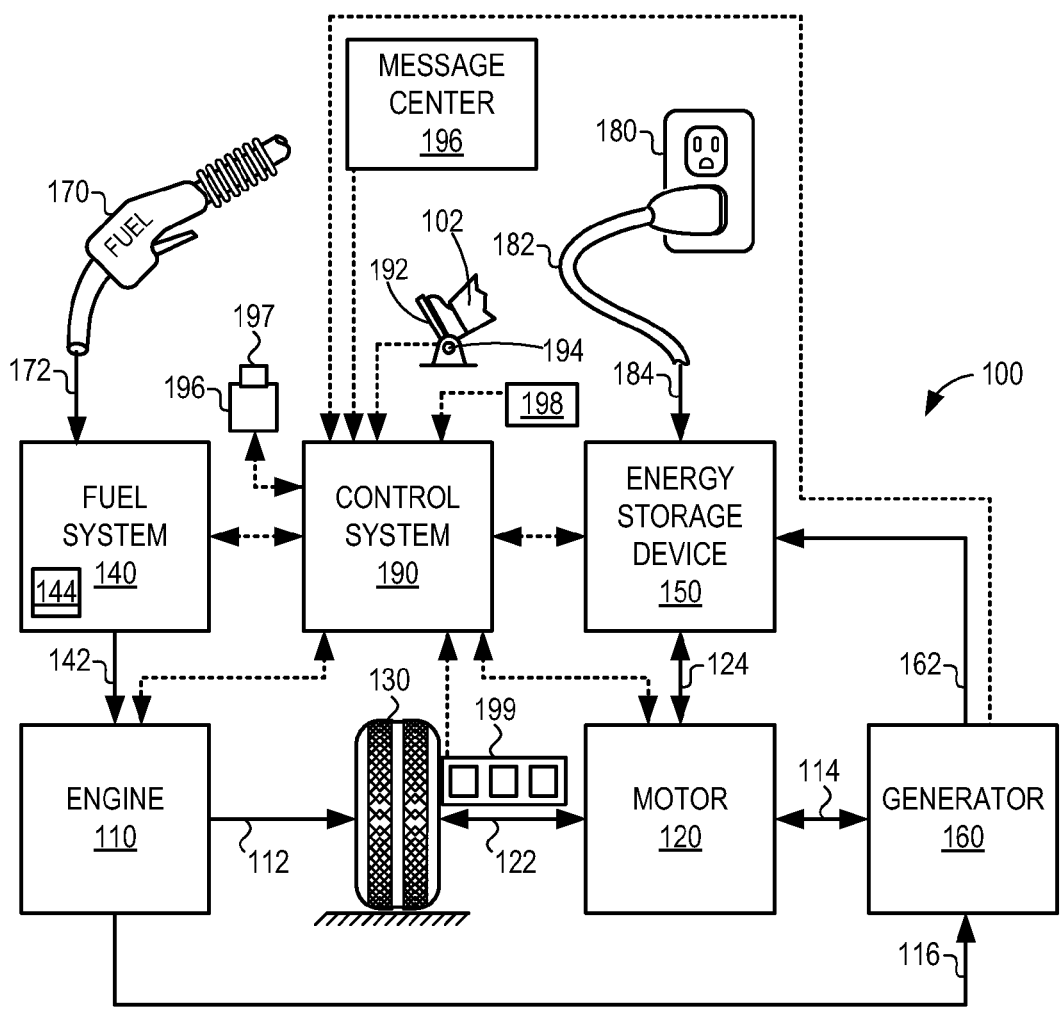

SYSTEMS AND METHODS FOR A TWO-VALVE NON-INTEGRATED REFUELING CANISTER ONLY SYSTEM

BACKGROUND AND SUMMARY

Vehicle fuel systems include evaporative emission control systems designed to reduce the release of fuel vapors to the atmosphere. For example, vaporized hydrocarbons (HCs) from a fuel tank may be stored in a fuel vapor canister packed with an adsorbent which adsorbs and stores the vapors. At a later time, when the engine is in operation, the evaporative emission control system allows the vapors to be purged into the engine intake manifold for use as fuel.

Previously disclosed systems place a single fuel tank isolation valve (FTIV) between the fuel tank and the fuel vapor canister. The FTIV may be a solenoid valve under control of a pulse-width modulated signal. The FTIV may be partially opened to regulate fuel tank pressure during engine-on conditions, and fully opened to prepare the fuel tank for refueling.

However, combining tank pressure control with a refueling valve presents numerous potential issues. Opening the FTIV completely when a significant pressure exists within the fuel tank may result in the corking of other fuel tank valves such as a grade vent valve and/or a fill limit vent valve, rendering them unusable. Opening the FTIV in this fashion could also lead to an abundance of hydrocarbons entering the engine intake system, altering the air/fuel ratio, and potentially leading to engine stalling. Additionally, any delays or imprecision in control of an FTIV may increase release of hydrocarbons or degraded air-fuel ratio control during purging.

The inventors herein have recognized the above issues, and have developed systems and methods to at least partially address these issues. In one example, a system for a vehicle, comprising: a tank pressure control valve coupled in a first conduit between a fuel tank and a fuel vapor canister; a refueling valve coupled in a second, different, conduit between the fuel tank and the fuel vapor canister, the second conduit in parallel to the first conduit. In this way, two smaller, less complex valves may be utilized to control fuel tank vapor purging and fuel tank depressurization during refueling. This in turn may lower system cost and increase system functionality.

In another example, a method for a hybrid-electric vehicle, comprising: in response to a refueling request: opening a tank pressure control valve while maintaining a refueling valve closed; allowing a fuel tank pressure to decrease below a first threshold; and opening the refueling valve. In this way, fuel tank depressurization may be controlled during refueling such that fuel tank vent valves are not exposed to rapid pressure changes during refueling events which may cork the valves, rendering them unusable for future fuel tank venting events.

In yet another example, a system for a hybrid-electric vehicle, comprising: a tank pressure control valve coupled in a first conduit between a fuel tank and a fuel vapor canister; a refueling valve coupled in a second conduit between the fuel tank and the fuel vapor canister, the second conduit in parallel to the first conduit; a controller configured with instructions stored in non-transitory memory and executable by a processor to: in response to a refueling request: opening a tank pressure control valve while maintaining a refueling valve closed; allowing a fuel tank pressure to decrease below a first threshold; and opening the refueling valve. In this way, that fuel tank vent valves are not exposed to significant pressure differentials during refueling events which may close the valves, and thus may prevent adequate refueling.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTIONS OF THE DRAWINGS

Figure 2:
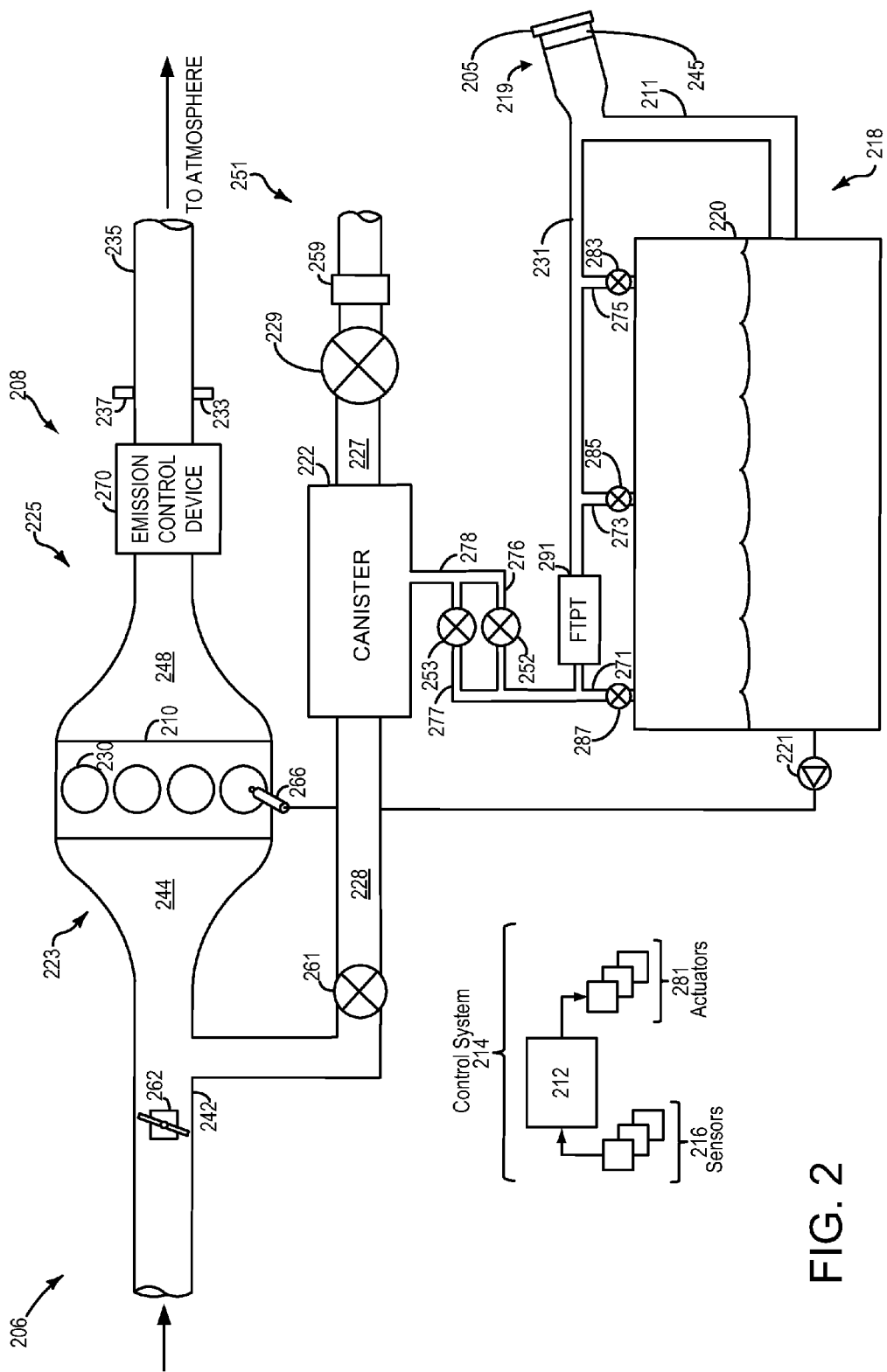
Figure 3:
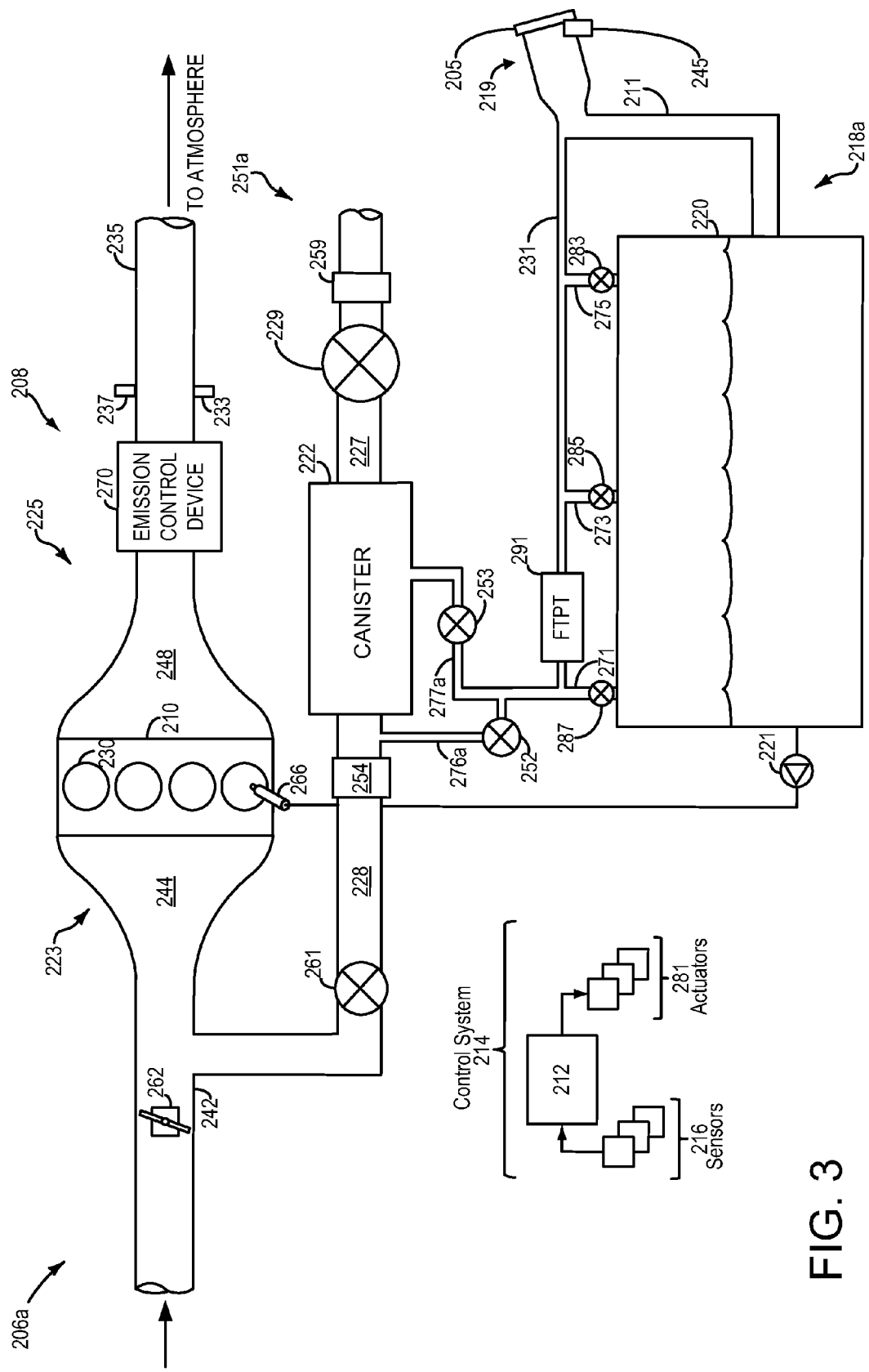
Figure 4:
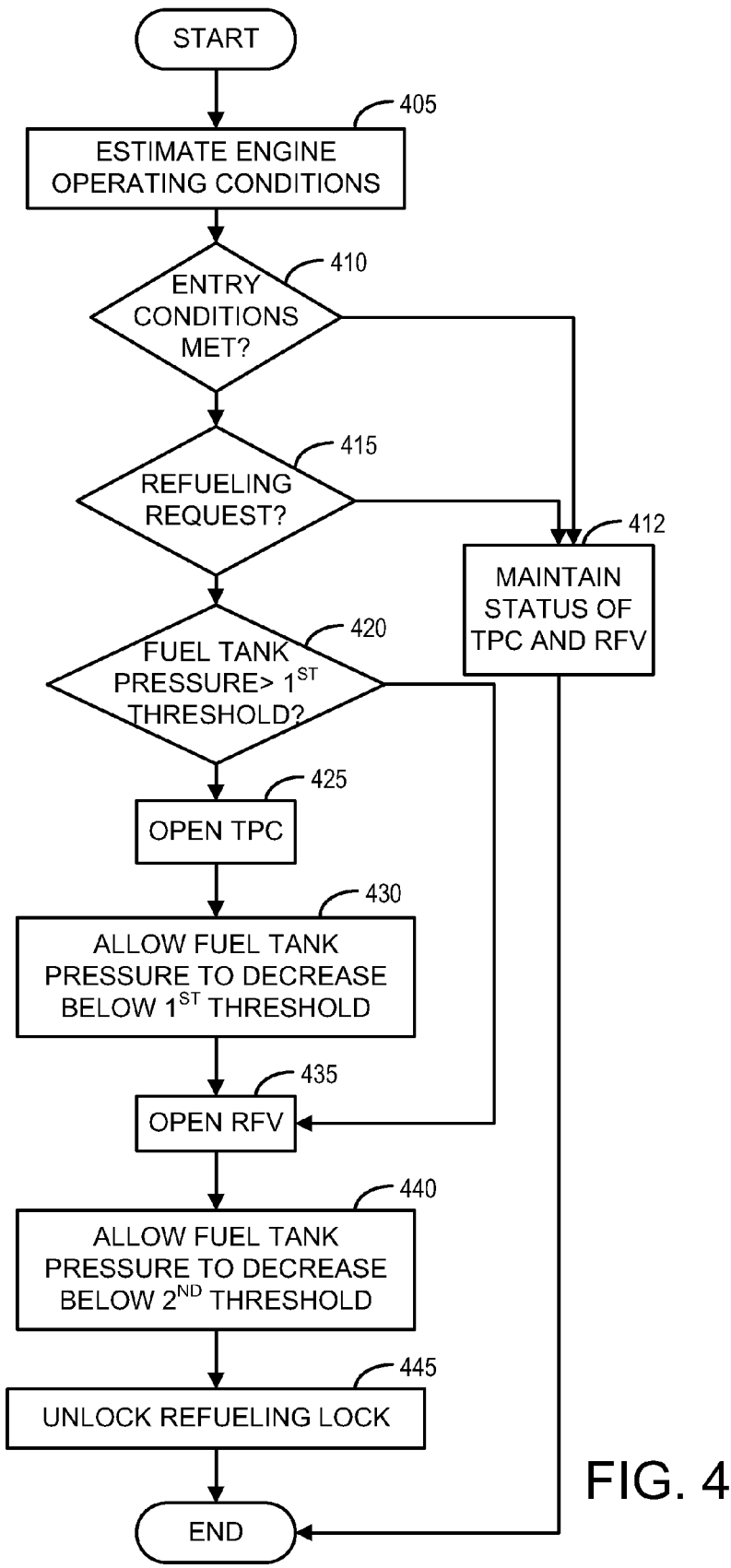
Figure 5:
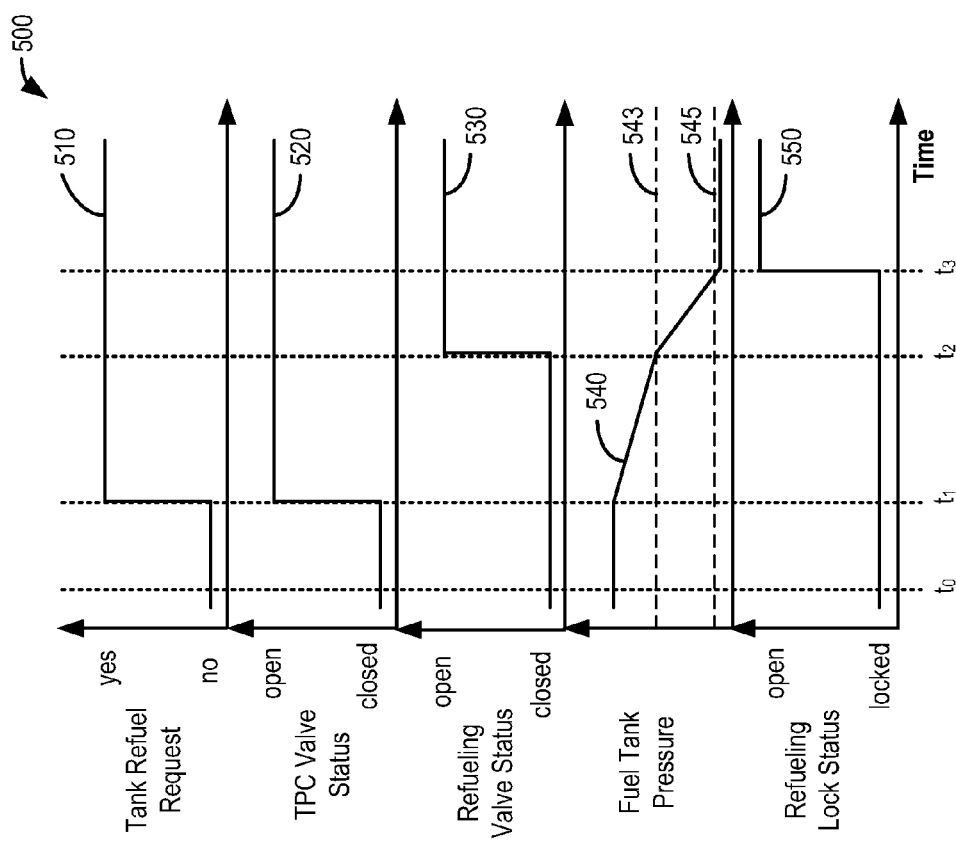

FIG. 1 shows an example vehicle propulsion system
FIG. 2 shows an example vehicle system with a fuel system and an evaporative emissions system.
FIG. 3 shows an alternative example vehicle system with a fuel system and an evaporative emission system.
FIG. 4 shows an example method for depressurizing a fuel tank in response to a tank refueling request.
FIG. 5 shows an example timeline for depressurizing a fuel tank in response to a tank refueling request.

DETAILED DESCRIPTION

The following description related to systems and methods for depressurizing a fuel tank. The fuel tank may be included in a vehicle, such as a hybrid electric vehicle, as shown in FIG. 1. The vehicle may include a fuel system and an evaporative emissions system, as shown in FIGS. 2 and 3. The fuel system may be coupled to the evaporative emissions system via a tank pressure valve and a refueling valve, the two valves in parallel, as shown by FIGS. 2 and 3. As shown by FIGS. 4 and 5, a refueling request may be followed by the opening of the tank pressure valve to decrease the fuel tank pressure below a first threshold, followed by the opening of the refueling valve to decrease the fuel tank pressure below a second threshold. The vehicle system may thus not include a fuel tank isolation valve.

FIG. 1 illustrates an example vehicle propulsion system 100. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g. gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (i.e. set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some embodiments. However, in other embodiments, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some embodiments, motor 120 may propel the vehicle via a first set of drive wheels and engine 110 may propel the vehicle via a second set of drive wheels.

In other embodiments, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

Fuel system 140 may include one or more fuel storage tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g. E10, E85, etc.) or a blend of gasoline and methanol (e.g. M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some embodiments, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 110, motor 120, fuel system 140, energy storage device 150, and generator 160. As will be described by the process flow of FIG. 3, control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal.

Energy storage device 150 may periodically receive electrical energy from a power source 180 residing external to the vehicle (e.g. not part of the vehicle) as indicated by arrow 184. As a non-limiting example, vehicle propulsion system 100 may be configured as a plug-in hybrid electric vehicle (HEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may disconnected between power source 180 and energy storage device 150. Control system 190 may identify and/or control the amount of electrical energy stored at the energy storage device, which may be referred to as the state of charge (SOC).

In other embodiments, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some embodiments, fuel tank 144 may be configured to store the fuel received from fuel dispensing device 170 until it is supplied to engine 110 for combustion. In some embodiments, control system 190 may receive an indication of the level of fuel stored at fuel tank 144 via a fuel level sensor. The level of fuel stored at fuel tank 144 (e.g. as identified by the fuel level sensor) may be communicated to the vehicle operator, for example, via a fuel gauge or indication in a vehicle instrument panel 196.

The vehicle propulsion system 100 may also include an ambient temperature/humidity sensor 198, and a roll stability control sensor, such as a lateral and/or longitudinal and/or yaw rate sensor(s) 199. The vehicle instrument panel 196 may include indicator light(s) and/or a text-based display in which messages are displayed to an operator. The vehicle instrument panel 196 may also include various input portions for receiving an operator input, such as buttons, touch screens, voice input/recognition, etc. For example, the vehicle instrument panel 196 may include a refueling button 197 which may be manually actuated or pressed by a vehicle operator to initiate refueling. For example, as described in more detail below, in response to the vehicle operator actuating refueling button 197, a fuel tank in the vehicle may be depressurized so that refueling may be performed.

In an alternative embodiment, the vehicle instrument panel 196 may communicate audio messages to the operator without display. Further, the sensor(s) 199 may include a vertical accelerometer to indicate road roughness. These devices may be connected to control system 190. In one example, the control system may adjust engine output and/or the wheel brakes to increase vehicle stability in response to sensor(s) 199.

FIG. 2 shows a schematic depiction of a vehicle system 206. The vehicle system 206 includes an engine system 208 coupled to an emissions control system 251 and a fuel system 218. Emission control system 251 includes a fuel vapor container or canister 222 which may be used to capture and store fuel vapors. In some examples, vehicle system 206 may be a hybrid electric vehicle system.

The engine system 208 may include an engine 210 having a plurality of cylinders 230. The engine 210 includes an engine intake 223 and an engine exhaust 225. The engine intake 223 includes a throttle 262 fluidly coupled to the engine intake manifold 244 via an intake passage 242. The engine exhaust 225 includes an exhaust manifold 248 leading to an exhaust passage 235 that routes exhaust gas to the atmosphere. The engine exhaust 225 may include one or more emission control devices 270, which may be mounted in a close-coupled position in the exhaust. One or more emission control devices may include a three-way catalyst, lean NOx trap, diesel particulate filter, oxidation catalyst, etc. It will be appreciated that other components may be included in the engine such as a variety of valves and sensors.

Fuel system 218 may include a fuel tank 220 coupled to a fuel pump system 221. The fuel pump system 221 may include one or more pumps for pressurizing fuel delivered to the injectors of engine 210, such as the example injector 266 shown. While only a single injector 266 is shown, additional injectors are provided for each cylinder. It will be appreciated that fuel system 218 may be a return-less fuel system, a return fuel system, or various other types of fuel system.

Vapors generated in fuel system 218 may be routed to an evaporative emissions control system 251 which includes a fuel vapor canister 222 via vapor recovery line 231, before being purged to the engine intake 223. Vapor recovery line 231 may be coupled to fuel tank 220 via one or more conduits and may include one or more valves for isolating the fuel tank during certain conditions. For example, vapor recovery line 231 may be coupled to fuel tank 220 via one or more or a combination of conduits 271, 273, and 275.

Further, in some examples, one or more fuel tank vent valves in conduits 271, 273, or 275. Among other functions, fuel tank vent valves may allow a fuel vapor canister of the emissions control system to be maintained at a low pressure or vacuum without increasing the fuel evaporation rate from the tank (which would otherwise occur if the fuel tank pressure were lowered). For example, conduit 271 may include a grade vent valve (GVV) 287, conduit 273 may include a fill limit venting valve (FLVV) 285, and conduit 275 may include a grade vent valve (GVV) 283. Further, in some examples, recovery line 231 may be coupled to a fuel filler system 219. In some examples, fuel filler system may include a fuel cap 205 for sealing off the fuel filler system from the atmosphere. Refueling system 219 is coupled to fuel tank 220 via a fuel filler pipe or neck 211.

Further, refueling system 219 may include refueling lock 245. In some embodiments, refueling lock 245 may be a fuel cap locking mechanism. The fuel cap locking mechanism may be configured to automatically lock the fuel cap in a closed position so that the fuel cap cannot be opened. For example, the fuel cap 205 may remain locked via refueling lock 245 while pressure or vacuum in the fuel tank is greater than a threshold. In response to a refuel request, e.g., a vehicle operator initiated request, the fuel tank may be depressurized and the fuel cap unlocked after the pressure or vacuum in the fuel tank falls below a threshold. A fuel cap locking mechanism may be a latch or clutch, which, when engaged, prevents the removal of the fuel cap. The latch or clutch may be electrically locked, for example, by a solenoid, or may be mechanically locked, for example, by a pressure diaphragm.

In some embodiments, refueling lock 245 may be a filler pipe valve located at a mouth of fuel filler pipe 211. In such embodiments, refueling lock 245 may not prevent the removal of fuel cap 205. Rather refueling lock 245 may prevent the insertion of a refueling pump into fuel filler pipe 211. The filler pipe valve may be electrically locked, for example by a solenoid, or mechanically locked, for example by a pressure diaphragm.

In some embodiments, refueling lock 245 may be refueling door lock, such as a latch or a clutch which locks a refueling door located in a body panel of the vehicle. The refueling door lock may be electrically locked, for example by a solenoid, or mechanically locked, for example by a pressure diaphragm.

In embodiments where refueling lock 245 is locked using an electrical mechanism, refueling lock 245 may be unlocked by commands from controller 212, for example, when a fuel tank pressure decreases below a pressure threshold. In embodiments where refueling lock 245 is locked using a mechanical mechanism, refueling lock 245 may be unlocked via a pressure gradient, for example, when a fuel tank pressure decreases to atmospheric pressure.

Emissions control system 251 may include one or more emissions control devices, such as one or more fuel vapor canisters 222 filled with an appropriate adsorbent, the canisters are configured to temporarily trap fuel vapors (including vaporized hydrocarbons) during fuel tank refilling operations and "running loss" (that is, fuel vaporized during vehicle operation). In one example, the adsorbent used is activated charcoal. Emissions control system 251 may further include a canister ventilation path or vent line 227 which may route gases out of the canister 222 to the atmosphere when storing, or trapping, fuel vapors from fuel system 218.

Vent line 227 may also allow fresh air to be drawn into canister 222 when purging stored fuel vapors from fuel system 218 to engine intake 223 via purge line 228 and purge valve 261. For example, purge valve 261 may be normally closed but may be opened during certain conditions so that vacuum from engine intake 244 is provided to the fuel vapor canister for purging. In some examples, vent line 227 may include an air filter 259 disposed therein upstream of a canister 222.

Flow of air and vapors between canister 222 and the atmosphere may be regulated by a canister vent valve 229. Canister vent valve 229 may be a normally open valve, so that tank pressure control valve 252 (TPC) and refueling valve 253 (RFV) may control venting of fuel tank 220 with the atmosphere. TPC 252 and RFV 253 may be normally closed valves, that when opened, allow for the venting of fuel vapors from fuel tank 220 to canister 222. Fuel vapors may then be vented to atmosphere via canister vent valve 229, or purged to engine intake system 223 via canister purge valve 261.

Prior art examples typically utilize a single fuel tank isolation valve (FTIV) coupled between fuel tank 220 and fuel canister 222 (or between fuel tank 220 and purge line 228 or vent line 227). In contrast, as depicted in FIG. 2, fuel system 218 and emission control system 251 are linked by TPC 252 and RFV 253. TPC 252 may be coupled between fuel tank 220 and canister 222 within conduit 276. RFV 253 may be coupled between fuel tank 220 and canister 222 within conduit 277. Conduits 276 and 277 may merge to form canister entry conduit 278. TPC 252 may have a smaller orifice and a smaller aperture than RFV 253. TPC 252 may be actuated during engine-on conditions to decrease the pressure in fuel tank 220 by venting fuel vapor to canister 222. During refueling events, TPC 252 may be utilized to decrease the pressure in fuel tank 220 to a first threshold. RFV 253 may be used to vent fuel vapor from tank 220 and canister 222 during refueling operations. RFV 253 may be a normally closed valve that is opened in response to certain conditions. For example, RFV 253 may be actuated when the pressure in fuel tank 220 is below the first threshold. TPC 252 may have a smaller orifice diameter than the orifice diameter of RFV 253. TPC 252 may include an armature with a smaller diameter than an armature included in RFV 253. TPC 252 may include an armature with fewer coil turns than an armature included in RFV 253. A method for a refueling operation is described herein and with reference to FIG. 4.

Vehicle system 206 thus does not include a fuel tank isolation valve positioned between the fuel tank and the fuel vapor canister, the fuel tank isolation valve configured to isolate the fuel tank from the fuel vapor canister when closed. Vehicle system 206 does not include a fuel tank isolation valve positioned between the fuel tank and purge line 228, the fuel tank isolation valve configured to isolate the fuel tank from the purge when closed. Vehicle system 206 does not include a fuel tank isolation valve positioned between the fuel system and the evaporative emissions system, the fuel tank isolation valve configured to isolate the fuel system from the evaporative emissions system when closed. Vehicle system 206 does not include a fuel tank isolation valve positioned between the fuel system and the evaporative emissions system, the fuel tank isolation valve configured to isolate the fuel system from the evaporative emissions system when closed, such that no other valve may be opened to fluidly couple the fuel system to the evaporative emissions system. Vehicle system 206 does not include a fuel tank isolation valve positioned between the fuel system and the evaporative emissions system, the fuel tank isolation valve configured to isolate the fuel system from the evaporative emissions system when closed and further configured to partially open during purging conditions and configured to completely open during refueling conditions. Vehicle system 206 does not include a fuel tank isolation valve configured to isolate refueling vapors from diurnal vapors while closed.

The vehicle system 206 may further include a control system 214. Control system 214 is shown receiving information from a plurality of sensors 216 (various examples of which are described herein) and sending control signals to a plurality of actuators 281 (various examples of which are described herein). As one example, sensors 216 may include exhaust gas sensor 237 located upstream of the emission control device, temperature sensor 233, pressure sensor 291, and canister temperature sensor 243. Other sensors such as pressure, temperature, air/fuel ratio, and composition sensors may be coupled to various locations in the vehicle system 206. As another example, the actuators may include fuel injector 266, throttle 262, fuel tank isolation valve 253, pump 292, and refueling lock 245. The control system 214 may include a controller 212. The controller may receive input data from the various sensors, process the input data, and trigger the actuators in response to the processed input data based on instruction or code programmed therein corresponding to one or more routines. An example control routine is described herein with regard to FIG. 4.

FIG. 3 depicts an alternate vehicle system 206a in accordance with the current disclosure. Vehicle system 206a may include components of vehicle system 206, including engine system 208, engine intake 223, engine exhaust 225, fuel filler system 219, and control system 214. Vehicle system 206a may also include fuel system 218a, and emissions control system 251a.

Similarly to fuel system 218 and emissions control system 251 depicted in FIG. 2, fuel system 218a and emissions control system 251 may include TPC 252 and RFV 253. TPC 252 may be coupled between fuel tank 220 and canister 222 within conduit 276a. RFV 253 may be coupled between fuel tank 220 and canister 222 within conduit 277a. Additionally, TPC buffer canister 254 may be disposed within purge line 228 between canister 222 and purge valve 261. The actuation of TPC 252 and RFV 253 in this configuration may follow similar methods described herein with regards to FIG. 2.

The systems depicted in FIGS. 2 and 3 and described herein may enable one or more systems. In one example, a system for a vehicle, comprising: a tank pressure control valve coupled in a first conduit between a fuel tank and a fuel vapor canister; a refueling valve coupled in a second, different, conduit between the fuel tank and the fuel vapor canister, the second conduit in parallel to the first conduit. The vehicle may not include a fuel tank isolation valve positioned between the fuel tank and the fuel vapor canister, the fuel tank isolation valve configured to isolate the fuel tank from the fuel vapor canister when closed. The tank pressure control valve may have a smaller orifice diameter than an orifice diameter of the refueling valve. The tank pressure control valve and refueling valve may be solenoid valves. The tank pressure control valve may include an armature having a smaller volume than an armature of the refueling valve. The system may further comprise a tank pressure control buffer canister coupled in a purge conduit between the fuel vapor canister and a canister purge valve. The system may further comprise a refueling lock.

The technical results of implementing this system include increased control over fuel tank venting and fuel tank depressurization during refueling events. By not utilizing a single fuel tank isolation valve, system costs and complexity may be decreased, while fuel tank venting and depressurization may be performed in a manner that does not require pulse-width modulated operation and does not expose the fuel tank vent valves to rapid changes in pressure or to large pressure differentials.

FIG. 4 depicts an example control routine 400 for refueling a vehicle system, such as the vehicle systems depicted in FIGS. 1-3. In particular, control routine 400 may manage the depressurization of a fuel tank in response to a refueling request from a vehicle operator. Method 400 may be carried out by controller 212. Method 400 may begin at 405 by estimating engine operating conditions. Engine operating conditions may be measured, estimated or inferred, and may include various vehicle conditions, such as vehicle speed, as well as various engine operating conditions, such as engine operating mode, engine speed, engine temperature, exhaust temperature, boost level, MAP, MAF, torque demand, horsepower demand, etc.

At 410, method 400 may include determining if entry conditions are met. Entry conditions may include engine off conditions when an engine of the vehicle is not in operation. For example, the vehicle may be a hybrid electric vehicle operating in an engine off mode and being powered by batteries in the vehicle. As another example, entry conditions may include a key-off event wherein the vehicle is turned off, e.g., where the vehicle is parked or is not in use and the engine is not running Entry conditions may be further based on temperatures in the fuel system or evaporative emission control system, e.g., entry conditions during engine-off conditions may be based on a temperature in the fuel system less than a threshold temperature or greater than a threshold temperature. For example, entry conditions may include determining if a temperature in the fuel system is in a predetermined range of temperatures. If entry conditions are not met, method 400 may proceed to 412. At 412, method 400 may include maintaining the status of the TPC and RFV. Method 400 may then end.

If entry conditions are met at 410, method 400 proceeds to 415. At 415, method 400 includes determining if a refuel request occurs. For example, a refuel request may comprise a vehicle operator depression of a button, e.g., refueling button 197, on a vehicle instrument panel in the vehicle, e.g., instrument panel 196. Thus, the refuel request may include manually requesting opening of a fuel cap coupled to the fuel tank. For example, a vehicle operator may provide input to the vehicle system indicating a desire to refuel the vehicle. If a refuel request does not occur at 415, method 400 may proceed to 412. At 412, method 400 may include maintaining the status of the TPC and RFV. Method 400 may then end.

If a refuel request occurs at 415, method 400 may proceed to 420. At 420, method 400 may include determining whether the fuel tank pressure is greater than a first threshold. Fuel tank pressure may be determined through a pressure sensor coupled within the fuel tank. If the fuel tank pressure is not greater than the first threshold, method 400 may proceed to 430. If the fuel tank pressure is greater than the first threshold, method 400 may proceed to 425.

At 425, method 400 may include opening the TPC. At 425, method 400 may also include opening the TPC while maintaining the RFV in a closed position. Opening the TPC may include actuating a solenoid coupled to the TPC. In this way, fuel vapor may be released to the evaporative emission system of the vehicle via the TPC, without causing an undue pressure change that may interfere with other components of the fuel system or evaporative emissions system.

Continuing at 425, method 400 may include allowing the fuel tank pressure to decrease below the first threshold. When the fuel tank pressure has decreased below the first threshold, method 400 may proceed to 435.

At 435, method 400 may include opening the RFV. At 435, method 400 may also include opening the RFV while maintaining the TPC in an open position. Opening the RFV may include actuating a solenoid coupled to the RFV.

Continuing at 440, method 400 may include allowing the fuel tank pressure to decrease below a second threshold. The second threshold may represent a lesser fuel tank pressure than the first threshold at 420. In some embodiments, at 440, method 400 may include allowing the fuel tank pressure to decrease to atmospheric pressure. When the fuel tank pressure has decreased below the second threshold, method 400 may proceed to 445. At 445, method 400 may include unlocking the fuel cap. In this way, refueling may be accomplished only when the fuel tank pressure has decreased below the second threshold. Method 400 may then end.

The systems depicted in FIGS. 1-3 and described herein, and the method depicted in FIG. 4 and described herein may enable one or more systems and one or more methods. In one example, a method for a hybrid-electric vehicle, comprising: in response to a refueling request: opening a tank pressure control valve while maintaining a refueling valve closed; allowing a fuel tank pressure to decrease below a first threshold; and opening the refueling valve. The method may further comprise allowing the fuel tank pressure to decrease below a second threshold, the second threshold lower than the first threshold; and unlocking a refueling lock. The method may further comprise, in response to a fuel tank vapor purging request, opening the tank pressure control valve while maintaining the refueling valve closed. The method may be implemented wherein the tank pressure control valve is coupled in a first conduit between a fuel tank and a fuel vapor canister; and wherein the refueling valve is coupled in a second conduit between the fuel tank and the fuel vapor canister, the second conduit in parallel to the first conduit. The method may be implemented wherein the hybrid-electric vehicle does not include a fuel tank isolation valve positioned between the fuel tank and the fuel vapor canister, the fuel tank isolation valve configured to isolate the fuel tank from the fuel vapor canister when closed. The technical result of implementing this method is a graduated tank depressurization during refueling, wherein the tank pressure control valve is opened first, depressurizing the tank to a first threshold, followed by opening the refueling valve and depressurizing the tank to a second threshold, for example atmospheric pressure.

In another example, a system for a hybrid-electric vehicle, comprising: a tank pressure control valve coupled in a first conduit between a fuel tank and a fuel vapor canister; a refueling valve coupled in a second conduit between the fuel tank and the fuel vapor canister, the second conduit in parallel to the first conduit; a controller configured with instructions stored in non-transitory memory and executable by a processor to: in response to a refueling request: opening a tank pressure control valve while maintaining a refueling valve closed; allowing a fuel tank pressure to decrease below a first threshold; and opening the refueling valve. The hybrid-electric vehicle may not include a fuel tank isolation valve positioned between the fuel tank and the fuel vapor canister, the fuel tank isolation valve configured to isolate the fuel tank from the fuel vapor canister when closed. The system may further comprise a refueling lock. The controller may be further configured with instructions to: allow the fuel tank pressure to decrease below a second threshold, the second threshold lower than the first threshold; and unlock the refueling lock. The controller may be further configured with instructions to: in response to a fuel tank vapor purging request, opening the tank pressure control valve while maintaining the refueling valve closed. The system may further comprise a tank pressure control buffer canister coupled in a purge conduit between the fuel vapor canister and a canister purge valve. The tank pressure control valve and refueling valve may be solenoid valves. The tank pressure control valve may include an armature having a smaller volume than an armature of the refueling valve. The technical result of implementing this system is an increase in control over fuel tank depressurization and refueling procedure that does not expose fuel tank vent valves to rapid pressure changes or pressure differentials great enough to cork or otherwise force the vent valves closed, impeding refueling events or future tank venting events.

FIG. 5 depicts an example timeline 500 for venting a fuel tank upon a refueling request using the method described herein and with regards to FIG. 4. Timeline 500 includes plot 510, indicating the status of a tank refueling request over time. Timeline 500 also includes plot 520, indicating the status of a TPC valve over time; plot 530, indicating the status of a refueling valve over time; plot 540, indicating the pressure inside a fuel tank over time; and plot 550, indicating the status of a fuel cap over time. Line 543 represents a first threshold for fuel tank pressure. Line 545 represents a second threshold for fuel tank pressure.

At time $t_0$, no tank refuel request in indicated, as shown by plot 510. As such, the status of the TPC valve and the status of the refueling valve are maintained. As shown by plots 520 and

530, the valves are closed at time $t_0$ and thus are maintained closed. Additionally, the fuel cap is locked and maintained locked, as shown by plot 550.

At time $t_1$, a refueling request is received, as shown by plot 510. As shown by plot 540, the fuel tank pressure at time $t_1$ is greater than first threshold 543. Thus, the TPC valve is opened, as shown by plot 520. The RFV is maintained closed, as shown by plot 530. Additionally, the fuel cap is maintained in a locked conformation, as shown by plot 550.

From time $t_1$ to time $t_2$, the TPC is open, allowing for fuel vapors to vent from the fuel tank to the evaporative emissions system. As such, the fuel tank pressure decreases, as indicated by plot 540. At time $t_2$, fuel tank pressure drops below first threshold 543. In response to fuel tank pressure dropping below first threshold 543, the RFV is opened at time $t_2$.

From time $t_2$ to time $t_3$, the TPC and RFV are both open, allowing for fuel vapors to vent from the fuel tank to the evaporative emissions system. As such, the fuel tank pressure decreases, as indicated by plot 540. At time $t_3$, fuel tank pressure drops below second threshold 545. In response to fuel tank pressure dropping below second threshold 545, the fuel cap is unlocked, allowing refueling to proceed.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system for a vehicle, comprising:
   a tank pressure control valve coupled in a first conduit between a fuel tank and a fuel vapor canister;
   a refueling valve coupled in a second, different, conduit between the fuel tank and the fuel vapor canister, the second conduit in parallel to the first conduit; and
   a tank pressure control buffer canister coupled in a purge conduit between the fuel vapor canister and a canister purge valve.

2. The system of claim 1, where the vehicle does not include a fuel tank isolation valve positioned between the fuel tank and the fuel vapor canister, the fuel tank isolation valve configured to isolate the fuel tank from the fuel vapor canister when closed, and where the vehicle does not include a fuel tank vent valve positioned in parallel with the tank pressure control valve and the refueling valve, the fuel tank vent valve configured to relieve fuel tank pressure above a threshold during a condition where the tank pressure control valve and refueling valve are each closed.

3. The system of claim 1, where the tank pressure control valve has a smaller orifice diameter than an orifice diameter of the refueling valve.

4. The system of claim 1, where the tank pressure control valve and refueling valve are solenoid valves.

5. The system of claim 4, where the tank pressure control valve includes an armature having a smaller volume than an armature of the refueling valve, and wherein the first conduit has an outlet coupled to the purge conduit between the fuel vapor canister and the tank pressure control buffer canister.

6. The system of claim 1, further comprising a mechanical refueling lock configured to unlock based on a pressure gradient.

7. A method for a hybrid-electric vehicle, comprising:
   in response to receiving a refueling request during a condition when a fuel tank pressure is above a first threshold:
      opening a tank pressure control valve while maintaining a refueling valve closed;
      allowing the fuel tank pressure to decrease below the first threshold; and
      opening the refueling valve; and
   in response to receiving a refueling request during a condition when a fuel tank pressure is below the first threshold:
      opening the refueling valve while maintaining the tank pressure control valve closed.

8. The method of claim 7, further comprising:
   allowing the fuel tank pressure to decrease below a second threshold, the second threshold lower than the first threshold; and
   unlocking a refueling lock.

9. The method of claim 7, further comprising:
   in response to a fuel tank vapor purging request, opening the tank pressure control valve while maintaining the refueling valve closed.

10. The method of claim 7, wherein the tank pressure control valve is coupled in a first conduit between a fuel tank and a fuel vapor canister; and
   wherein the refueling valve is coupled in a second conduit between the fuel tank and the fuel vapor canister, the second conduit in parallel to the first conduit.

11. The method of claim 10, wherein the hybrid-electric vehicle does not include a fuel tank isolation valve positioned between the fuel tank and the fuel vapor canister, the fuel tank isolation valve configured to isolate the fuel tank from the fuel vapor canister when closed.

12. A system for a hybrid-electric vehicle, comprising:
   a tank pressure control valve coupled in a first conduit between a fuel tank and a purge line coupled to a fuel vapor canister;

a refueling valve coupled in a second conduit between the fuel tank and the fuel vapor canister, the second conduit in parallel to the first conduit, the second conduit directly coupled to an inlet of the fuel vapor canister; and a controller configured with instructions stored in non-transitory memory and executable by a processor to:

in response to receiving a refueling request during a condition when a fuel tank pressure is above a first threshold:

open the tank pressure control valve while maintaining the refueling valve closed;

allow the fuel tank pressure to decrease below the first threshold; and then open the refueling valve.

13. The system of claim 12, wherein the hybrid-electric vehicle does not include a fuel tank isolation valve positioned between the fuel tank and the fuel vapor canister, the fuel tank isolation valve configured to isolate the fuel tank from the fuel vapor canister when closed.

14. The system of claim 13, further comprising a refueling lock.

15. The system of claim 14, wherein the controller is further configured with instructions to:

allow the fuel tank pressure to decrease below a second threshold, the second threshold lower than the first threshold; and unlock the refueling lock.

16. The system of claim 14, wherein the controller is further configured with instructions to:

in response to a fuel tank vapor purging request, opening the tank pressure control valve while maintaining the refueling valve closed;

in response to receiving a refueling request during a condition when a fuel tank pressure is below the first threshold, open the refueling valve while maintaining the tank pressure control valve closed;

allow the fuel tank pressure to decrease below a second threshold, the second threshold lower than the first threshold; and then unlock the refueling lock.

17. The system of claim 13, further comprising a tank pressure control buffer canister coupled in a purge conduit between the fuel vapor canister and a canister purge valve.

18. The system of claim 12, where the tank pressure control valve and refueling valve are solenoid valves.

19. The system of claim 18, where the tank pressure control valve includes an armature having a smaller volume than an armature of the refueling valve.

* * * * *